United States Patent
Matouka et al.

(10) Patent No.: US 8,310,200 B2
(45) Date of Patent: Nov. 13, 2012

(54) INDUCTIVE CHARGERS AND INDUCTIVE CHARGING SYSTEMS FOR PORTABLE ELECTRONIC DEVICES

(75) Inventors: Michael F. Matouka, Shelby Township, MI (US); Shawn L. Boozer, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 455 days.

(21) Appl. No.: 12/424,398

(22) Filed: Apr. 15, 2009

(65) Prior Publication Data

US 2010/0264871 A1 Oct. 21, 2010

(51) Int. Cl.
*H02J 7/00* (2006.01)
*H04B 7/00* (2006.01)
*G01V 3/00* (2006.01)

(52) U.S. Cl. .... 320/108; 455/41.1; 455/269; 455/343.1; 340/854.3; 340/870.31

(58) Field of Classification Search .................... 320/108
See application file for complete search history.

(56) References Cited

U.S. PATENT DOCUMENTS

| | | | | |
|---|---|---|---|---|
| 5,633,574 A * | 5/1997 | Sage | ............. | 320/107 |
| 5,773,954 A | 6/1998 | VanHorn | | |
| 7,026,789 B2 * | 4/2006 | Bozzone et al. | ............. | 320/108 |
| 7,271,569 B2 | 9/2007 | Oglesbee | | |
| 7,612,528 B2 | 11/2009 | Baarman et al. | | |
| 7,868,585 B2 * | 1/2011 | Sarnowsky et al. | ........... | 320/108 |
| 2005/0007067 A1 * | 1/2005 | Baarman et al. | ............. | 320/108 |
| 2005/0085122 A1 * | 4/2005 | Chiou | ............. | 439/500 |
| 2006/0061325 A1 * | 3/2006 | Tang et al. | ............. | 320/108 |
| 2006/0247738 A1 * | 11/2006 | Schmeling et al. | ............. | 607/61 |
| 2007/0182367 A1 | 8/2007 | Partovi | | |
| 2007/0279002 A1 * | 12/2007 | Partovi | ............. | 320/115 |
| 2008/0265835 A1 * | 10/2008 | Reed et al. | ............. | 320/108 |
| 2009/0021211 A1 * | 1/2009 | Zhang et al. | ............. | 320/108 |
| 2009/0079387 A1 * | 3/2009 | Jin et al. | ............. | 320/108 |
| 2009/0096413 A1 * | 4/2009 | Partovi et al. | ............. | 320/108 |
| 2009/0096414 A1 * | 4/2009 | Cheng et al. | ............. | 320/108 |
| 2009/0096415 A1 * | 4/2009 | Beart et al. | ............. | 320/108 |
| 2009/0153098 A1 * | 6/2009 | Toya et al. | ............. | 320/108 |
| 2010/0156345 A1 * | 6/2010 | Phelps, III | ............. | 320/108 |
| 2010/0308665 A1 * | 12/2010 | Itkonen | ............. | 307/104 |

FOREIGN PATENT DOCUMENTS

| | | |
|---|---|---|
| CA | 2567634 A1 | 12/2002 |
| CN | 101044664 A | 9/2007 |

OTHER PUBLICATIONS

Johnson, J. "Tech clinic expert Q & A—Feb. 2006—A Closer Look," Popular Mechanics, Feb. 2006, p. 2, [retrieved on Apr. 3, 2009]. Retrieved from internet: <URL: www.popularmechanics.com/how_to_central/technology/2242491.html?nav=hpPrint...>.
Chinese Patent Office, Chinese Office Action dated Apr. 27, 2012 for Chinese Patent Application No. 201010164374.9.

* cited by examiner

*Primary Examiner* — Drew A Dunn
*Assistant Examiner* — Nathaniel Pelton
(74) *Attorney, Agent, or Firm* — Ingrassia Fisher & Lorenz, P.C.

(57) ABSTRACT

An apparatus is provided for wirelessly charging a portable electronic device. An embodiment of the apparatus includes an inductive charger with a housing having an internal compartment, wherein the internal compartment has a first lateral dimension, and a primary coil disposed within the internal compartment. The primary coil has a second lateral dimension that is less than the first lateral dimension, and the primary coil is slidably engaged within the internal compartment.

9 Claims, 10 Drawing Sheets

INDUCTIVE CHARGERS AND INDUCTIVE CHARGING SYSTEMS FOR PORTABLE ELECTRONIC DEVICES

TECHNICAL FIELD

The present invention generally relates to wireless charging, and more particularly relates to inductive charging systems for portable electronic devices and inductive chargers that include a slidable coil.

BACKGROUND

Portable electronic devices, such as cellular telephones, two-way radios, pagers, gaming devices, and remote control devices, commonly use rechargeable batteries to provide electrical power to the devices' components. Wireless charging of a device's rechargeable batteries can be accomplished by inductive means with a primary coil located in a charger base unit and a secondary coil located in the device. When power is applied to the charger base unit, a current is passed through the primary coil creating a magnetic flux. When the secondary coil of the portable electronic device is placed in close proximity to the primary coil, the magnetic flux couples to the secondary coil inducing a current in the secondary coil. The secondary coil is coupled to the device's battery compartment terminals. The current induced in the secondary coil is used to charge batteries installed in the battery compartment of the portable electronic device.

A problem facing wireless charging is that portable electronic devices come in a myriad of shapes and sizes. A further problem for inductive wireless charging is a lack of standardization in the industry with regard to the position of a secondary coil within the portable electronic device. In order for sufficient electrical energy to be produced by a device's secondary coil, the primary coil of the associated charger base unit and the secondary coil of the device must be positioned in close-enough magnetic proximity. Optimal charging or recharging of an electronic device cannot be achieved if the primary and secondary coils are not suitably aligned. Accordingly, a charger base unit for a particular device must have its primary coil positioned in a location that corresponds with the position of the device's secondary coil.

The lack of standardization in the relative positioning of the secondary coils, among other things, has resulted in unique or dedicated charger base unit for each portable electronic device or device type. Current charger base units typically are not adapted to provide wireless charging for devices having various geometries or with secondary coils placed in disparate locations within a similar geometry. Accordingly, a consumer with a plurality of wirelessly-rechargeable, portable electronic devices typically must also have a corresponding number of charger base units (e.g., one charger base unit for each portable electronic device). The cost, physical space, and power connectivity requirements for such a plurality of charger base units is significant.

Accordingly, it is desirable to provide wireless charging technologies that enable a single charger base unit to be capable of wirelessly charging the batteries of portable electronic devices having a variety of geometries (e.g., universal charging), without requiring a plurality of dedicated charger base units and power connectors. Furthermore, other desirable features and characteristics of the inventive subject matter will become apparent from the subsequent detailed description and the appended claims, taken in conjunction with the accompanying drawings and the foregoing technical field and background.

SUMMARY

Embodiments of apparatus and inductive charging systems are provided for wirelessly charging portable electronic devices. An embodiment of the apparatus comprises an inductive charger with a housing having an internal compartment, wherein the internal compartment has a first lateral dimension and a primary coil disposed within the internal compartment, wherein the primary coil has a second lateral dimension that is less than the first lateral dimension, and the primary coil is slidably engaged within the internal compartment. An embodiment of the portable electronic device includes an inductive coil disposed within the portable electronic device and a coil magnet disposed within the portable electronic device.

An embodiment of the inductive charging system comprises an inductive charger that includes an inductive charger base comprising a housing having a coil compartment internal to the housing, a primary coil disposed within and slidably engaged within the coil compartment, and a first magnet attached to the primary coil. The inductive charging system further includes a portable electronic device that includes a secondary coil, and a second magnet, wherein the second magnet is adapted to produce a magnetic field, and the first magnet is adapted to exert a force to the primary coil sufficient to cause the primary coil to slide within the coil compartment when the first magnet is acted upon by the magnetic field.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments include an inductive charger unit with a movable primary coil for wirelessly charging a portable electronic device having a secondary coil. These embodiments may provide one or more advantages over current wireless charging devices, including advantages such as a wireless charging technology that enables a single charger base unit to be capable of wirelessly charging the batteries of portable electronic devices having a variety of geometries (e.g., universal charging), without requiring a plurality of dedicated charger base units and power connectors.

Figure 1:
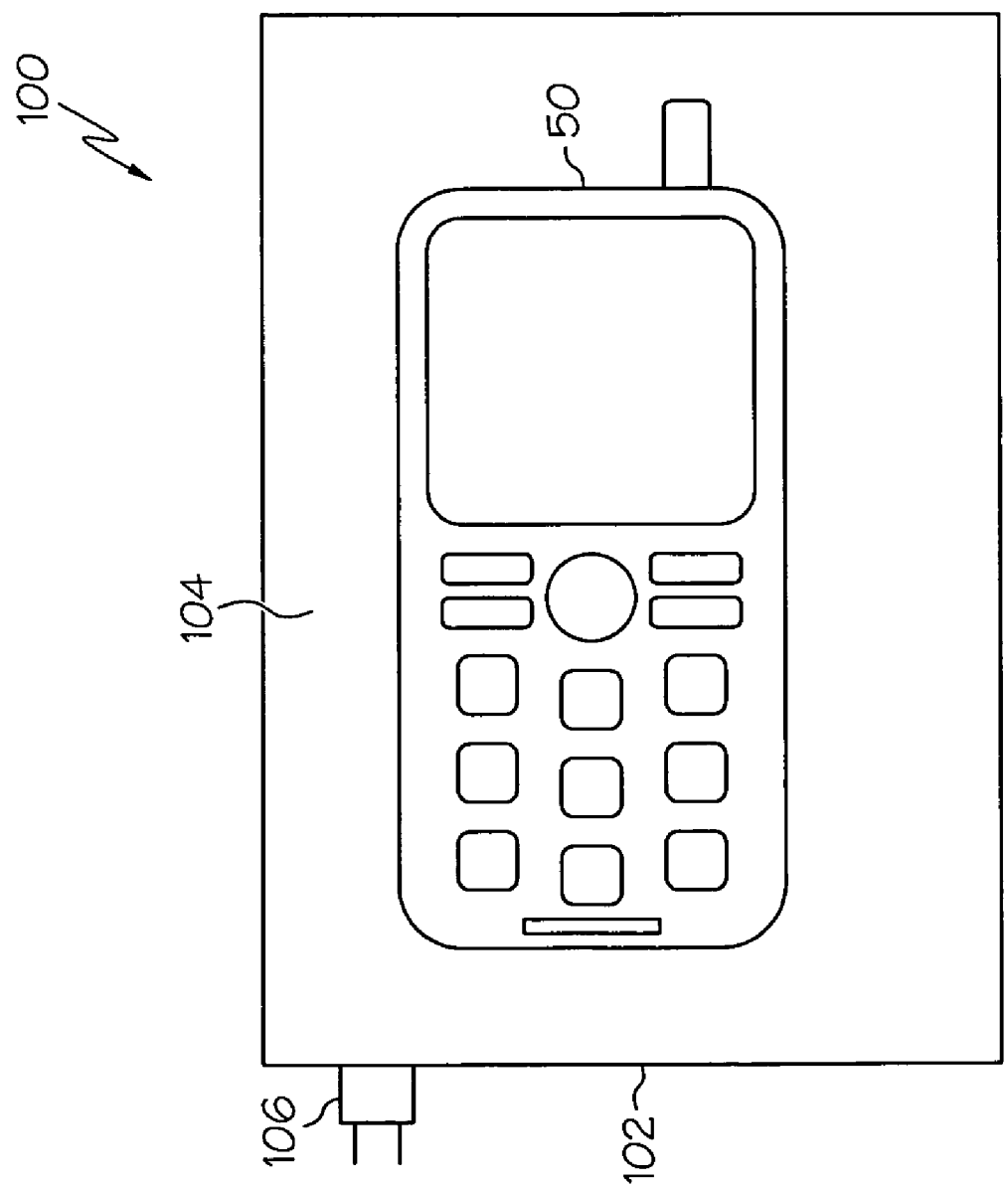
FIG. 1 illustrates an exterior top view of a stand-alone inductive charger for wireless charging of a portable electronic device, in accordance with an example embodiment.

FIG. 1 is an exterior top view of a stand-alone inductive charger 100 for wireless charging of a portable electronic device 50 in accordance with an example embodiment. The inductive charger 100 includes a housing 102 having a surface 104 and an interior compartment (not illustrated in FIG. 1). Inductive charger 100 further includes a primary coil (not illustrated in FIG. 1) and power input 106. As will be described in more detail in conjunction with FIGS. 3-10, later, the primary coil is contained within the interior compartment of the housing 102 and is electrically coupled to the power input 106. The power input 106 is mechanically coupled to the housing 102 and is configured to connect to an external electrical power source, such as line power or another alternating current (AC) or direct current (DC) power source (e.g., 12Vdc automotive). The inductive charger 100 may further include an electronics module, or electronic circuitry, to provide an electrical current of appropriate frequency and voltage to the primary coil. The power input 106 may include a power cord, plug, or other suitable mechanism adapted to receive an electrical current from the external power source [and provide the current to the primary coil].

When the portable device 50 is placed on the surface 104 of the housing 102, the portable device 50 may be considered to be inductively coupled to the inductive charger 100. Particularly, the portable device 50 includes an inductive element or a secondary coil (not illustrated in FIG. 1) and a battery compartment (not illustrated in FIG. 1), according to an embodiment. As will be described in more detail in conjunction with FIG. 3, later, when the primary coil is receiving a current and the portable device 50 is placed on the surface 104, a magnetic flux produced by the primary coil induces a current in the secondary coil of the portable device 50. This induced current is then passed (or provided) through conductive interconnections between the secondary coil and the battery compartment of the portable device 50, and may be used to charge a battery or batteries housed within the battery compartment. The portable device 50 may include, for example but no by way of limitation, a device selected from a group that includes, but is not limited to, a cellular telephone, a radio, a pager, a personal digital assistant (PDA), an MP3 player, a camera, a portable gaming device, and a remote control device.

Figure 2:
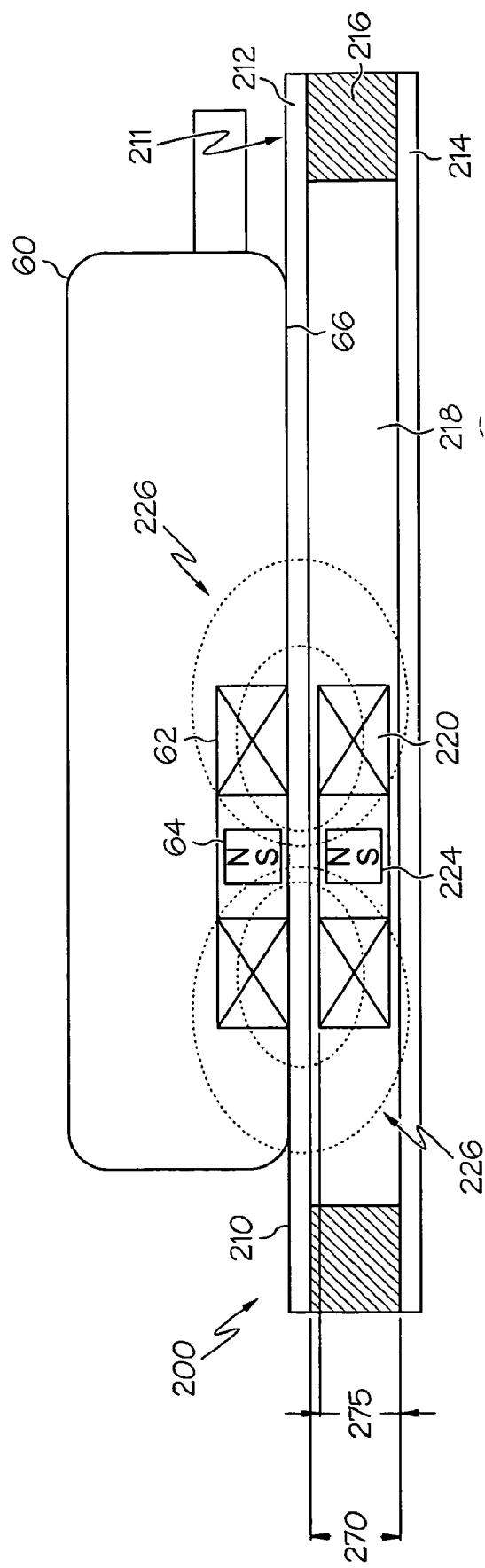
FIG. 2 illustrates a simplified cross-sectional view of an inductive charger that includes a slidable primary coil and a portable electronic device that includes a secondary coil, in accordance with an example embodiment.

FIG. 2 illustrates a simplified cross-sectional view of an inductive charger 200 that includes a primary coil 220 and a portable electronic device 60 that includes secondary coil 62 in accordance with an example embodiment. The inductive charger 200 includes a housing 210 having a compartment 218 internal to the housing 210. More particularly, the housing 210 has a top member 212, a bottom member 214, and a sidewall 216, which together define the internal compartment 218. The inductive charger 200 further includes a primary coil 220 and a primary coil magnet 224, which are each housed within the internal compartment 218. As will be described in more detail in conjunction with FIG. 3, later, the internal compartment 218 and the primary coil 220 are relatively sized so that the primary coil 220, being contained within the internal compartment 218 of the housing 210 of the inductive charger 200, may be slidably engaged within the internal compartment 218, (e.g., the primary coil 220 may move, or slide, within the internal coil compartment 218).

The portable electronic device 60 includes a secondary coil 62 and a secondary coil magnet 64, which are housed within the portable electronic device 60. When the portable device 60 is placed on an exterior surface 211 of the top member 212 of the housing 210 and the primary coil 220 and the secondary coil 62 are magnetically aligned, the portable device 60 may be considered to be inductively coupled to the inductive charger 200. As used herein, the term "magnetically aligned" means that two elements are in physical proximity to each other such that a magnetic flux produced by one element intersects (or links) the other element. As used herein, the term "inductively coupled" means that two inductive elements are in physical proximity to each other such that a magnetic flux produced by one inductive element intersects (or links) the second inductive element, and an electrical current may therefore be produced by the second inductive element. More particularly, when the primary coil 220 and the secondary coil 62 are magnetically aligned, portable device 60 may be inductively coupled to the inductive charger 200. Portable device 60 is inductively coupled to the inductive charger 200 when a current is flowing through the primary coil 220, thereby producing a magnetic flux 226 that links the secondary coil 62 and induces a current therein. Optimal inductive coupling is achieved when the primary coil 220 and the secondary coil 62 are aligned and in magnetic proximity to each other such that flux 226 linking the primary coil 220 and the secondary coil 62 is maximized. The closer the primary coil 220 and secondary coil 62 are in physical proximity (e.g., the secondary coil 62 aligned over the primary coil 220), the better magnetically aligned the coils are and the better, or more optimal, the inductive coupling is, which results in faster charging of the battery (batteries) of the portable electronic device 60.

According to an embodiment, magnetic alignment of the primary coil 220 and the secondary coil 62 may be achieved through the interaction of primary coil magnet 224 and secondary coil magnet 64. According to an embodiment, the primary coil magnet 224 is oriented within inductive charger 200 so that a pole having a first polarity (for example, North) is positioned toward the top member 212, and a pole having a second polarity (for example, South) is positioned away from the top member 212 (e.g., toward the bottom member 214). In addition, secondary coil magnet 64 is oriented within portable device 60 so that a pole having the second polarity (for example, South) is positioned toward an inductive charger facing surface 66 of the portable device 60, and a pole having the first polarity (for example, North) is positioned away from the inductive charger facing surface 66.

The primary coil magnet 224 is adapted to exert a force to the primary coil 220 sufficient to cause the primary coil 220 to slide within the internal compartment 218 when the primary coil magnet 224 is acted upon an external magnet field, e.g., a magnetic field produced from the secondary coil magnet 64. The primary coil magnet 224 is attached to the primary coil 220 (for example, the primary coil magnet 224 may be installed within a central opening of the primary coil 220), and the secondary coil magnet 64 is attached to the secondary coil 62 (for example, the secondary coil magnet 64 may be installed within a central opening of the secondary coil 62), according to an embodiment. When portable device 60 is placed on the exterior surface 211 of the top member 212, opposite poles of the magnets 224, 64 are attracted to each other.

When portable device 60 is placed on the exterior surface 211 of inductive charger 200 and the primary coil magnet 224 of the inductive charger 200 is attracted to the secondary coil magnet 64 of the portable device 60, primary coil magnet 224 imparts a force to primary coil 220, which moves or slides the primary coil 220 within the internal compartment 218. The primary coil magnet 224 moves or slides the primary coil 220 within the internal compartment 218 such that the primary coil magnet 224 of the inductive charger 200 magnetically aligns with the secondary coil magnet 64 of secondary coil 62, thereby aligning the primary coil 220 and the secondary coil 62. When a current flows through the primary coil 220 and the primary coil 220 and the secondary coil 62 are magnetically aligned, the magnetic flux 226 produced from the current flowing through the primary coil 220 induces an electrical current in the secondary coil 62 of portable device 60. According to an embodiment, the induced, secondary coil current is provided through conductive interconnections between the secondary coil 62 and a battery compartment (not illustrated) of the portable device 60, and may be used to charge a battery or batteries housed within the battery compartment.

When the primary coil 220 and the secondary coil 62 are not sufficiently magnetically aligned, charging of the portable device's batteries may be non-optimal or may not occur at all. Various embodiments provide magnetic alignment of the primary coil 220 and the secondary coil 62, even when the portable device 60 initially may be placed on the inductive charger 200 in a position in which the primary coil 220 and the secondary coil 62 are not sufficiently magnetically aligned. Sufficient magnetic alignment, enabled by the interaction of the primary coil magnet 224 and the secondary coil magnet 64 and the slidability of the primary coil 220, may result in better or more optimal inductive coupling. Particularly, sufficient magnetic alignment, enabled by the interaction of magnets 224, 64 and the slidability of the primary coil 220, may result in higher coupled power and thereby faster, more efficient charging when compared with other inductive chargers that do not include these features of the various embodiments. Further, better or more optimal inductive coupling of the primary coil 220 and the secondary coil 62 may result in lower losses, reduced heat dissipation, and less temperature rise of the battery being charged when compared with other inductive chargers.

Figure 3:
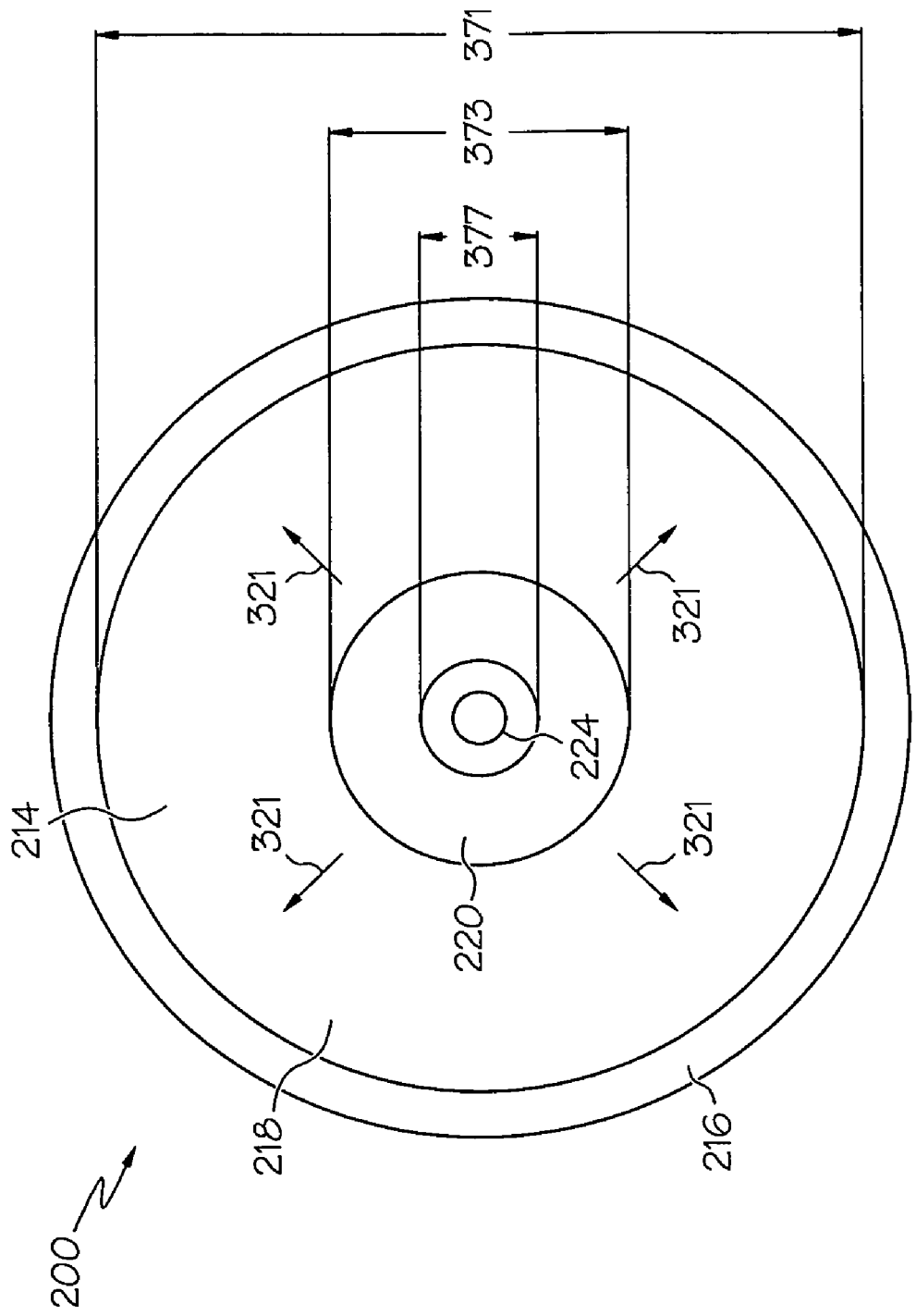
FIG. 3 illustrates a simplified top cross-sectional view of a slidable primary coil in a coil compartment of an inductive charger, in accordance with an example embodiment.

FIG. 3 illustrates a simplified top cross-sectional view of the slidable primary coil 220 of FIG. 2 in a coil compartment 218 of an inductive charger 200 in accordance with an example embodiment. As discussed previously in reference to FIG. 2, the primary coil 220 is disposed within the internal or coil compartment 218 of the inductive charger housing 210. The primary coil 220 is disposed within the coil compartment 218, and the coil compartment 218 is configured, in a manner that allows at least one degree of movement (e.g., linear movement) and more preferably, two degrees of movement (e.g., planar movement), which is exemplified by arrows 321, of the primary coil 220 within the internal coil compartment 218. The primary coil 220 is secured within the coil compartment 218 in a non-stationary manner. Particularly, the primary coil 220 is physically secured within the coil compartment 218 by the top member of the inductive charger 200 (e.g. top member 212, FIG. 2), the bottom member 214, and the sidewall 216 of the housing 210, although the primary coil 220 is not mechanically or physically secured or attached to the top member, bottom member 214, or sidewall 216, thereby allowing the primary coil 220 to move or slide within the internal coil compartment 218. More particularly, the internal coil compartment 218 has a first lateral dimension or length 371 and the primary coil 220 has a second lateral dimension or width 373 that is less than the first lateral dimension or length 371 of the internal compartment 218 so that the primary coil 220 may be slidably engaged within the internal coil compartment 218. The term "slidably engaged," as it relates to the physical relationship between the primary coil 220 and the internal coil compartment 218 means that the primary coil 220 is in physical contact with at least a portion of the internal coil compartment 218 (e.g. the bottom member 214, which, in part, forms the internal coil compartment 218) in a manner that the primary coil 220 is not restricted or prevented from moving or sliding within the internal coil compartment 218 (e.g., across the bottom member 214) at least a non-negligible distance (e.g., a distance of at least 20 to 50 percent of the length 371 of the bottom member 214). In accordance with an example embodiment, the bottom member 214 and a lower surface of the primary coil 220 (e.g. the surface of the primary coil 220 that is in physical contact with the bottom member 214) have smooth surfaces to enable easy movement (or sliding) of the primary coil 220 within the internal compartment 218.

In accordance with an example embodiment, the internal coil compartment 218 of the housing 210 is substantially circular, although it may have other cross-sectional shapes in other embodiments (e.g., square, rectangular, oval, or other shapes). The internal coil compartment 218 is defined by the sidewall 216 and may have the length (e.g. a diameter in the substantially circular embodiment) 371 in the range of about 35 millimeters (mm) to about 70 mm and, typically, about 50 mm. According to an embodiment, the width 373 of the primary coil 220 is in a range of about 20 percent to 50 percent of length 371 of the coil compartment 218 to allow the primary coil 220 to be slidably engaged within the coil compartment 218. In other embodiments, the primary coil width 373 may be wider or narrower that the above range, with respect to the coil compartment length 371.

Referring also to FIG. 2, the internal coil compartment 218 may have an inner height 270 in the range of about 5 mm to about 15 mm and typically, about 10 mm. In other embodiments, the length 371 and/or the inner height 270 of the coil compartment 218 may be greater or less than the above-given ranges. In accordance with an example embodiment, the primary coil 220 may have a cylindrical or doughnut cross-sectional shape, although primary coil 220 may have other cross-sectional shapes in other embodiments. The primary coil 220 may have a width 373 in the range of about 15 mm to about 40 mm and, typically, about 25 mm, according to an embodiment. The primary coil 220 may have a coil height 275 (FIG. 2) in the range of about 3 mm to about 10 mm and, typically about 5 mm, according to an embodiment. In other embodiments, the width 373 and/or height 275 of the primary coil 220 may be greater or less than the above-given ranges. According to an embodiment, the height 275 of the primary coil 220 is in a range of about 50 percent to 95 percent of the inner height 270 of the coil compartment 218. In other embodiments, the primary coil height 275 may be larger or smaller that the above range, with respect to the inner height 270.

According to an example embodiment, and as discussed previously, the primary coil magnet 224 is disposed in the internal coil compartment 218 of the housing 210 and is attached to the primary coil 220. According to a particular embodiment, the primary coil magnet 224 may be affixed to the primary coil 220 within an aperture (e.g., an area defined by an internal diameter 377) of the primary coil 220 such that movement of the primary coil magnet 224 results in movement of the primary coil 220.

Figure 4A:
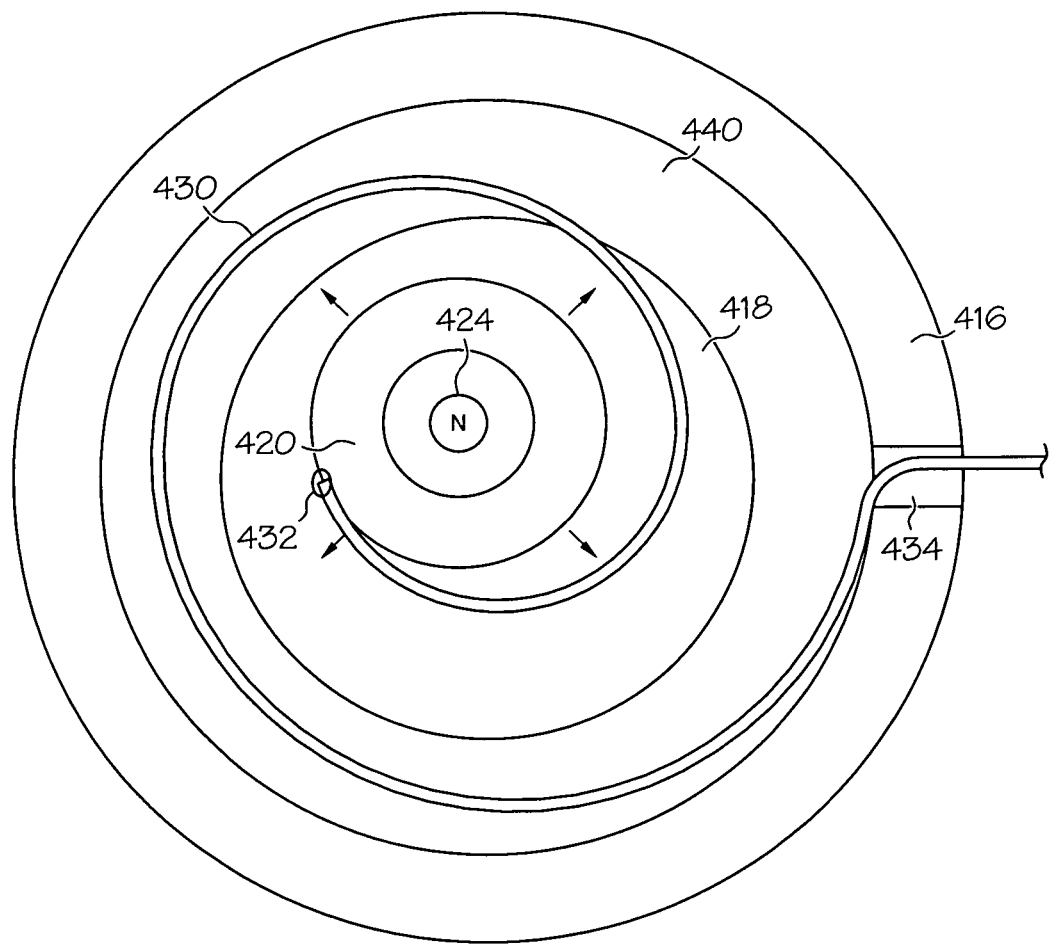
FIG. 4 illustrates simplified top and side cross-sectional views of an inductive charger that includes a slidable primary coil electrically coupled with a flexible cable, in accordance with an example embodiment.
Figure 4B:
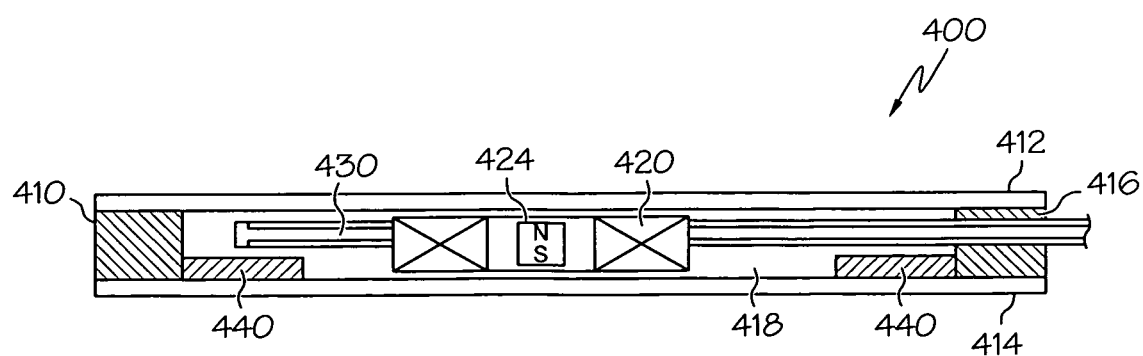

FIG. 4 illustrates simplified top and side cross-sectional views of an inductive charger 400 that includes a slidable primary coil 420 electrically coupled with a flexible cable 430 in accordance with an example embodiment. The inductive charger 400 includes a housing 410 having a top member 412, a bottom member 414, and a sidewall 416, which together define a coil compartment 418 internal to the housing 410. The inductive charger 400 further includes the primary coil 420 and a primary coil magnet 424, which are each housed within the internal coil compartment 418.

The sidewall 416 of the housing 410 of the inductive charger 400 includes a pass-through orifice 434 through which the flexible cable 430 passes and which provides strain relief to the flexible cable 430. The flexible cable 430 enters the internal coil compartment 418 at pass-through orifice 434 and may coil within the internal compartment 418 and at least partially around the primary coil 420, according to an embodiment. The flexible cable 430 is physically secured to the primary coil 420 at a coupling point 432, allowing the flexible cable 430 to move with the primary coil 420 as the primary coil 420 moves (or slides) about the internal coil compartment 418, as discussed in reference to FIG. 2 and FIG. 3.

The flexible cable 430 provides a means for providing an electrical current from an external power source to the primary coil 420. The flexible cable 430 is coupled between a power input (not illustrated FIG. 4) and the primary coil 420. More particularly, the flexible cable 430 is electrically coupled to the windings of primary coil 420 and is adapted to provide an electrical current to the windings of the primary coil 420. In accordance with an embodiment, the flexible cable 430 is a substantially flat, ribbon cable that includes at least two conductive wires (e.g., a positive wire and a negative (or ground) wire) for providing a current to the windings of the primary coil 420. The flexible cable 430 allows conduction of current to the primary coil 420 while allowing freedom of movement of the primary coil 420 with minimal restraining forces from the flexible cable 430.

In accordance with an embodiment, within the internal coil compartment 418, the inductive charger 400 further includes a ledge 440. The ledge 440 is disposed between the sidewall 416 and the bottom member 414. Particularly, the ledge 440 has a side surface that is disposed adjacent to the sidewall 416 and a bottom surface that is disposed adjacent to the bottom member 414. The ledge 440 has a height that is less than a height of the coil compartment 418, thereby restricting an area within the coil compartment 418 in which the primary coil 420 may move or slide.

The ledge 440 may be comprised of a noise dampening or soft material to minimize a bumping sound or noise that otherwise may result when the primary coil 420 moves or slides, as described herein, and comes into contact with the sidewall. As described, the ledge 440 also defines an area inside ledge 440 within the internal coil compartment 418 in which the primary coil 420 may move or slide. The ledge 440 further defines an area above ledge 440 in which the flexible cable 430 may occupy, thereby reducing bunching of the cable 430 or interference from the cable 430 with the primary coil 420 as the primary coil 420, together with the affixed flexible cable 430, moves or slides about in the internal coil compartment 418. The flexible cable 430 may also be supported by the ledge 440, keeping the cable 430 in a horizontal plane defined by the coupling point 432 and the pass-through orifice 434. According to an embodiment, the inner diameter of the ledge 440 is in a range of about 60 percent to 90 percent of the inner diameter (e.g., inner diameter 371, FIG. 3) of the coil compartment 418. In other embodiments, the inner diameter of the ledge 440 may be wider or narrower that the above range, with respect to the inner diameter of the coil compartment 418.

Figure 5A:
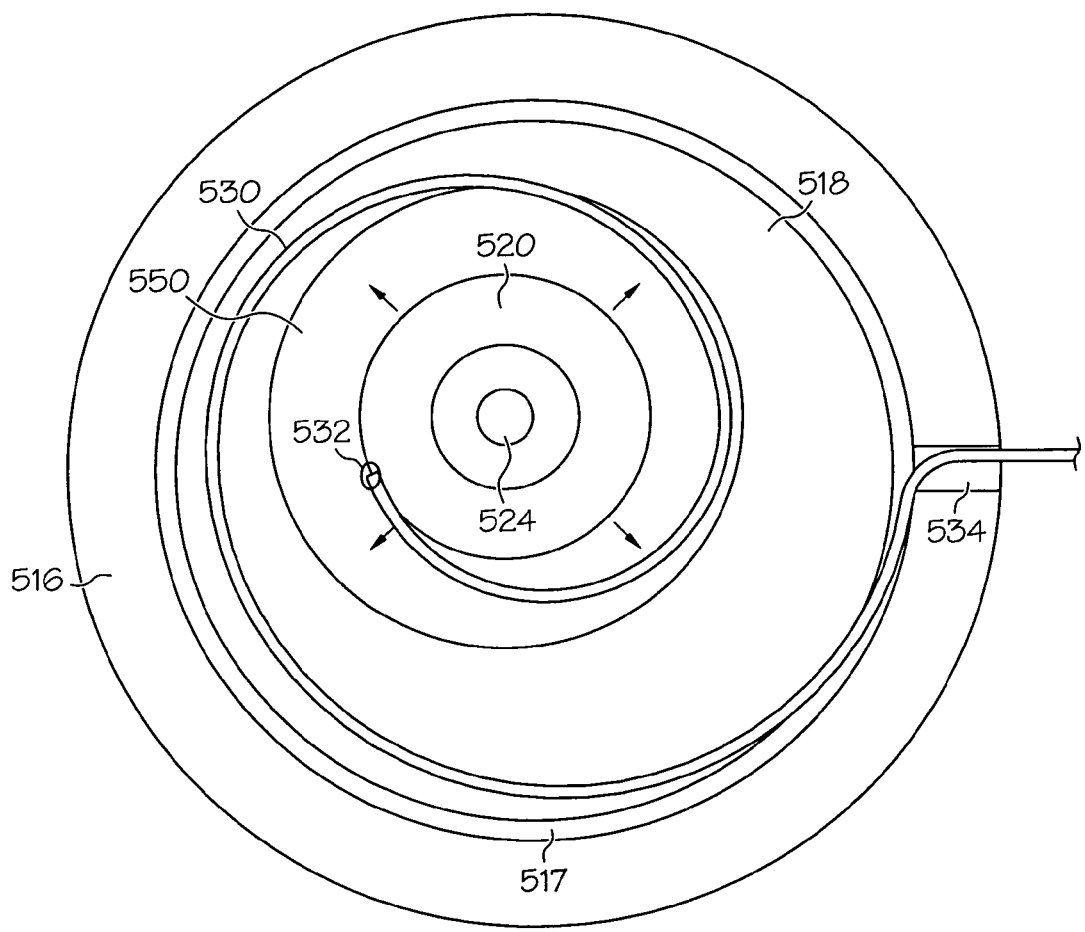
FIG. 5 illustrates simplified top and side cross-sectional views of an inductive charger that includes a movable primary coil electrically affixed to a coil bobbin and coupled with a flexible, flat ribbon cable, in accordance with another example embodiment.
Figure 5B:
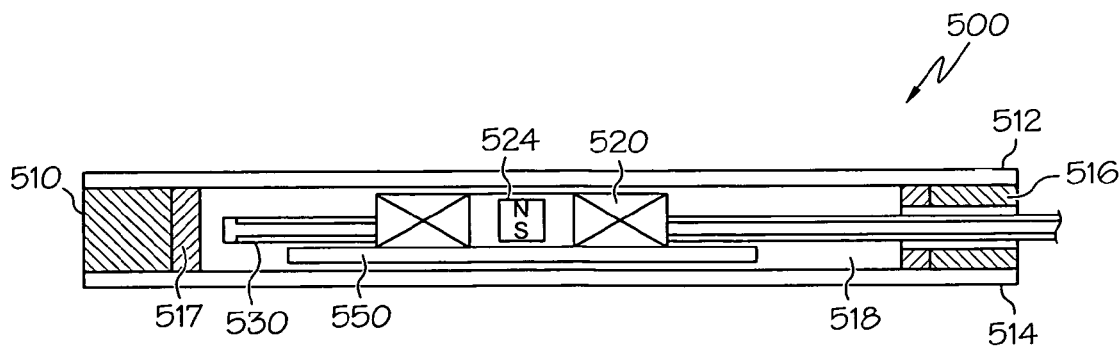

FIG. 5 illustrates simplified top and side cross-sectional views of an inductive charger 500 that includes a movable primary coil 520 affixed to a coil bobbin 550 and electrically coupled with a flexible, flat ribbon cable 530 in accordance with another example embodiment. The inductive charger 500 includes a housing 510 having a top member 512, a bottom member 514, and a sidewall 516, which together define a coil compartment 518 internal to the housing 510. The inductive charger 500 further includes the primary coil 520, a primary coil magnet 524, and the primary coil bobbin 550, which are each housed within the internal coil compartment 518.

In accordance with an embodiment, the coil bobbin 550 is contained within the housing 510 of the inductive charger 500 by the top member 512, bottom member 514, and sidewall 516 in a non-stationary (e.g., slidable) manner. The primary coil 520 is physically secured or attached to the coil bobbin 550. The primary coil 520 may be attached to the coil bobbin 550, for example, with an adhesive or by positioning the primary coil 520 over a center post of the coil bobbin 550, which may also be configured to house the primary coil magnet 524. The coil bobbin 550 and primary coil 520 are contained within the housing 510 in a non-stationary manner such that coil bobbin 550, together with the primary coil 520 (and primary coil magnet 524), may move or slide around within the internal coil compartment 518. Similar to the ledge 440 of the embodiment illustrated in FIG. 4, a lower portion of the coil bobbin 550 provides protection to the cable 530. Particularly, as the coil bobbin 550 and primary coil 520 move or slide about the internal compartment 518, the lower portion of the coil bobbin 550, rather than the primary coil 520, may bump into (or come into physical contact with) the sidewall 516. The lower portion of the coil bobbin 550 reduces the likelihood of the cable 530 being pinched or sandwiched between the primary coil 520 and the sidewall 516, which could potentially damage the cable 530 or coupling points between the cable 530 and the primary coil 520 or external power.

In accordance with an embodiment, the coil bobbin 550 may be plastic or comprised of a ferrite material, and/or other material that enhances the magnetic properties of the primary coil 520. A plastic coil bobbin may be utilized to hold the primary coil 520 and primary coil magnet 524 and provide a coupling point 532 for the cable 530 to the primary coil 520 coil windings. A plastic coil bobbin may further provide a smooth surface to facilitate the movement or sliding of the primary coil bobbin (together with the primary coil 520) over the bottom member 514. A coil bobbin comprised of a ferrite material (or other magnetic material) may be utilized to enhance magnetic coupling. The ferrite or other magnetic material may be used as or incorporated into the coil bobbin and may be in addition to or in lieu of a plastic material.

The sidewall 516 includes a portion 517 that is internal to the coil compartment 518. In accordance with an embodiment, a noise-dampening material 517 is disposed on the sidewall 516. As described in reference to the ledge 440 of FIG. 4, the noise dampening material 517 disposed on the sidewall 516 may minimize a bumping noise that otherwise may result when the primary coil 520 moves or slides, as described herein, and comes into contact with the sidewall 516.

Similar to the embodiment illustrated in FIG. 4, the sidewall 516 of the housing 510 of the inductive charger 500 includes a pass-through orifice 534 through which the flexible cable 530 passes. The flexible cable 530 enters the internal coil compartment 518 at the pass-through orifice 534 and winds around within the internal compartment 518 and around the primary coil 520. The flexible cable 530 is physically secured to windings (or wires) of the primary coil 520 at a coil coupling point 532, allowing the flexible cable 530 to move with the primary coil 520 and primary coil bobbin 550 as the primary coil 520 and primary coil bobbin 550 move (or slide) together about the internal coil compartment 518. Also similar to the embodiment illustrated in FIG. 4, the flexible cable 530 may also be supported by the coil bobbin 5500, keeping the cable 530 in a horizontal plane defined by the coupling point 532 and the pass-through orifice 534.

Figure 6A:
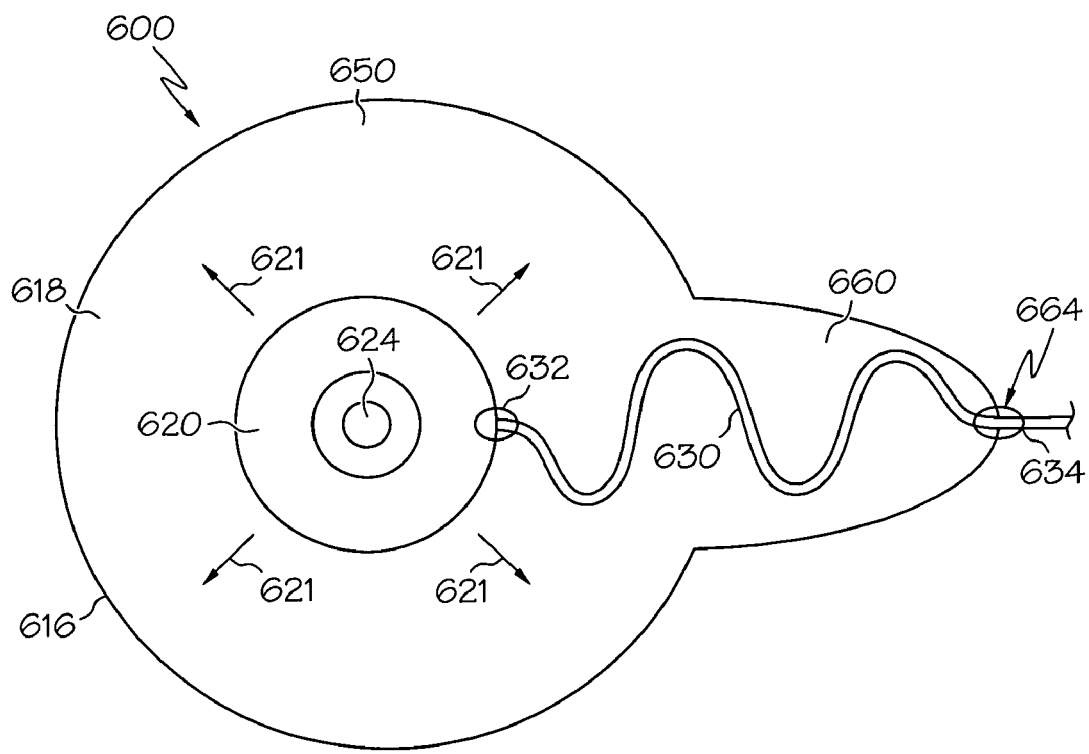
FIG. 6 illustrates simplified top and side cross-sectional views of an inductive charger that includes a movable primary coil electrically coupled with a flexible ribbon cable, in accordance with yet another example embodiment.
Figure 6B:
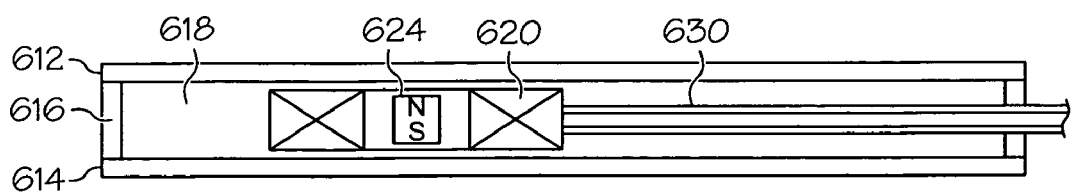

FIG. 6 illustrates simplified top view of an inductive charger 600 that includes a movable primary coil 620 in accordance with yet another example embodiment. The inductive charger 600 includes a housing having a top member 612, a bottom member 614, and a sidewall 616, which together define a compartment 618 internal to the housing. In accordance with an example embodiment, the internal compartment 618 includes a coil compartment 650, which may be substantially circular, for example, and a cable compartment 660, which may be substantially elliptical, for example, and which extends or protrudes from the coil compartment 650.

The inductive charger 600 further includes a primary coil 620 and a primary coil magnet 624, which are each housed within the coil compartment 650. The primary coil 620 is contained within the coil compartment 650 of the inductive charger 600 in a manner that allows the primary coil 620 to move, or slide, within the coil compartment 650 (e.g., as indicated by arrows 621), for example when the primary magnet 624 exerts a force to move the primary coil 620 in response to being magnetically attracted to a secondary coil magnet (not illustrated) of a portable electronic device that may be placed on the inductive charger 600.

In accordance with an embodiment, the inductive charger 600 further includes a cable 630. The cable 630 is electrically coupled to windings of the primary coil 620, at a coupling point 632, for providing a current to the windings of the primary coil 620. In accordance with an embodiment, the cable 630 may include a substantially flat, flexible ribbon cable and includes at least two conductive wires. In accordance with another embodiment, the cable 630 may comprise a spring-like, coiled cable that can stretch and flex as the primary coil moves or slides to align to a secondary coil of a portable electronic device placed on the inductive charger 600.

The cable 630 enters the internal compartment 618 at a pass-through orifice 634 in the sidewall 616 of the housing. In accordance with an embodiment, the pass-through orifice may be formed in the sidewall 616 within the cable compartment 660. In accordance with a particular embodiment, the pass-through orifice 634 is at or near a point 664 in the sidewall 616 where a semi-major axis, or major radius, of the cable compartment 660 intersects the sidewall 616 (e.g., a furthest extending portion of the cable compartment 660). The cable 630 enters the internal compartment 618 and extends through the cable compartment 660 to the coil compartment 650 and may coil or flex around within the coil compartment 650 and at least partially around the primary coil 620. The cable compartment 660 provides space where the cable 630 may move and gather, thereby minimizing cable interference with the movement of the primary coil 620 within the coil compartment 650.

Figure 7:
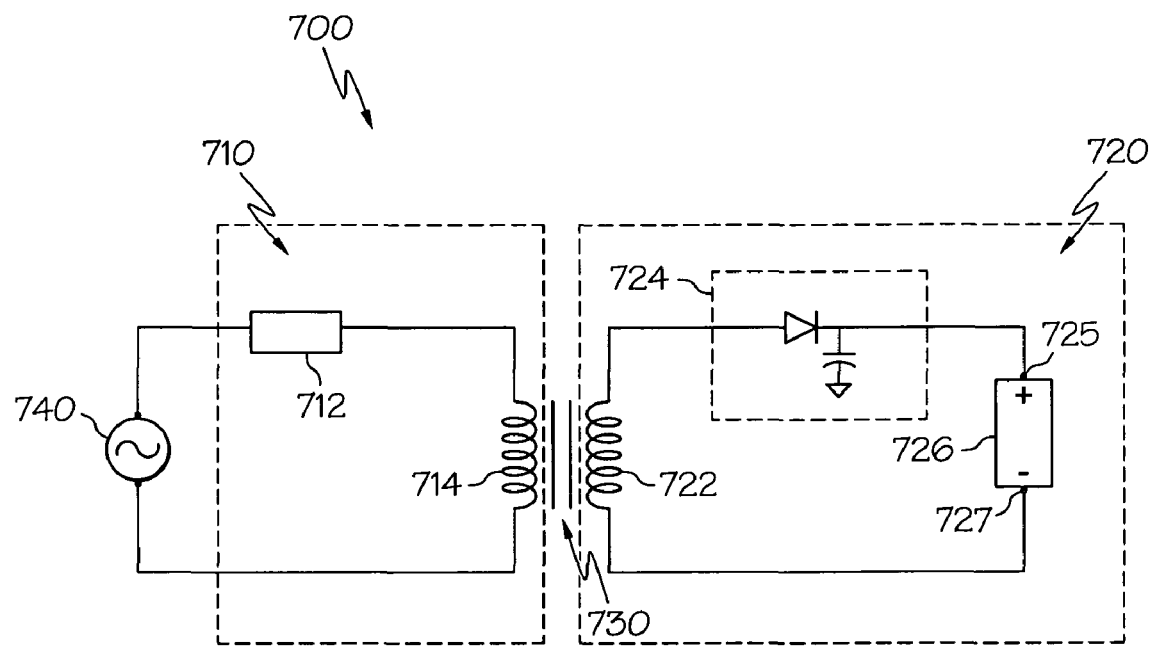
FIG. 7 is a simplified electrical schematic of portions of an inductive charging circuit implemented in an inductive charger and a portable electronic device, in accordance with an example embodiment.

FIG. 7 is a simplified electrical schematic of portions of an inductive charging circuit 700 implemented in an inductive charger 710 and a portable electronic device 720, in accordance with an example embodiment. The inductive charging circuit (or system) 700 includes a primary side or inductive charger 710 and a secondary side or portable electronic device 720. The inductive charging circuit 700 may further include an electronic module 712 within the inductive charger 710 and electrically coupled to an external power source 740 and to a primary coil 714. The electronics module 712 is configured to receive power from the external power source 740 and covert the power to an electrical current of appropriate frequency and voltage for provision to the primary coil 714. While the electronics module 712 is illustrated as an internal to the primary side or inductive charger 710, it should be appreciated that the electronics module 712 could be incorporated external to the inductive charger 710 and inductive charging circuit 700. The primary coil 714 is illustrated as being inductively coupled to a secondary coil 722 by a magnetic field or flux 730. The secondary coil 722 is coupled to a first battery terminal 725 and a second battery terminal 727. In accordance with an example embodiment, the secondary coil 722 may be coupled to the first battery terminal 725 through a charging control circuit (e.g., a rectifier-type circuit 724). The energy coupled from the primary coil 714 to the secondary coil 722 may be applied through the secondary coil 722 to charge a battery 726 or batteries coupled between the first battery terminal 725 and the second battery terminal 727.

Figure 8:
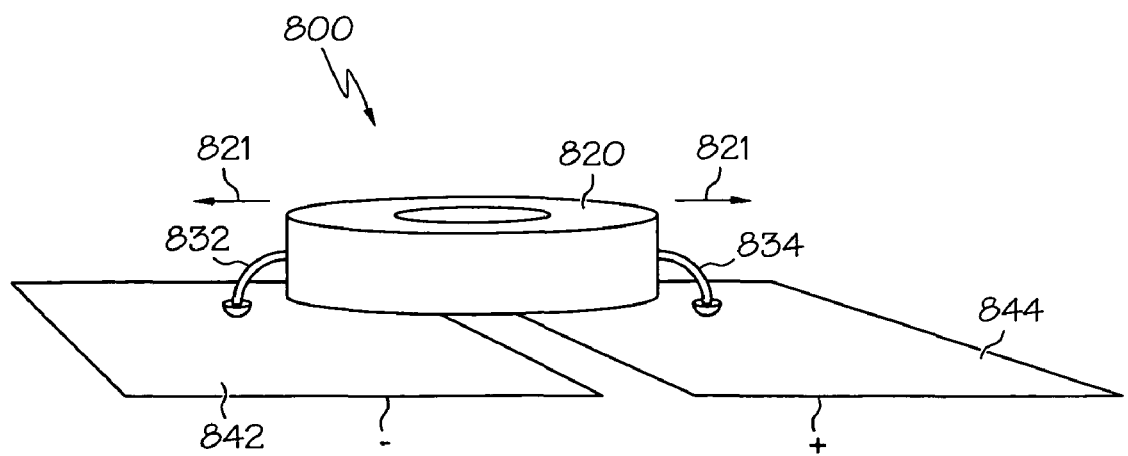
FIG. 8 illustrates portions of an inductive charger that includes a slidable primary coil with sliding contacts, in accordance with an example embodiment.

FIG. 8. illustrates a means for providing an electrical current to a primary coil of an inductive charger. More particularly, FIG. 8 illustrates internal of portions of an inductive charger 800 that includes a slidable primary coil 820 with sliding contacts 832, 834 that are electrically coupled with the windings of the primary coil 820, in accordance with an example embodiment. As discussed previously, the moveable (or slidable) primary coil enables better or more optimal inductive coupling between a primary coil and a secondary coil of a portable electronic device. To produce a magnetic flux, a current must be supplied to the primary coil. As discussed in reference to FIGS. 4-6, a flexible, flat ribbon cable electrically coupled to a primary coil of an inductive charger may be utilized as a means for providing the current to the primary coil. Alternatively and in accordance with another embodiment, the inductive charger 800 may further include a first conductive surface 842 and a second conductive surface 844, each coupled to an AC power input (not illustrated in FIG. 8) of the inductive charger 800 and disposed within an internal coil compartment (not illustrated in FIG. 8) of the inductive charger 800. The first conductive surface 842 has a first polarity (e.g., positive) and the second conductive surface 844 has a second polarity (e.g., negative or ground). To provide current to the primary coil 820, current may be provided to a first one of the conductive surfaces (e.g., first conductive surface 842) and discharged through a second one of the conductive surfaces (e.g., second conductive surface 844). More particularly, the primary coil 820 is electrically coupled to the conductive surfaces 842, 844 through the sliding contacts 832, 834. The first contact 832 may be electrically coupled to the primary coil 820 and adapted to slidably engage with the first conductive surface 842 (e.g., the first contact 832 is adapted to move or slide along the first conductive surface 842 a non-negligible distance). The second contact 834 may be electrically coupled to the primary coil 820 and adapted to slidably engage with the second conductive surface 844 (e.g., the second contact 834 is adapted to move or slide along the second conductive surface 844 a non-negligible distance). The contacts 832, 834 slide along conductive surfaces 842, 844 and thereby maintain the electrical connection and current flow as the primary coil 820 moves within the internal compartment of the inductive charger (e.g., as indicated by arrows 821), in order to align itself with a secondary coil of a portable electronic device to be charged.

Figure 9:
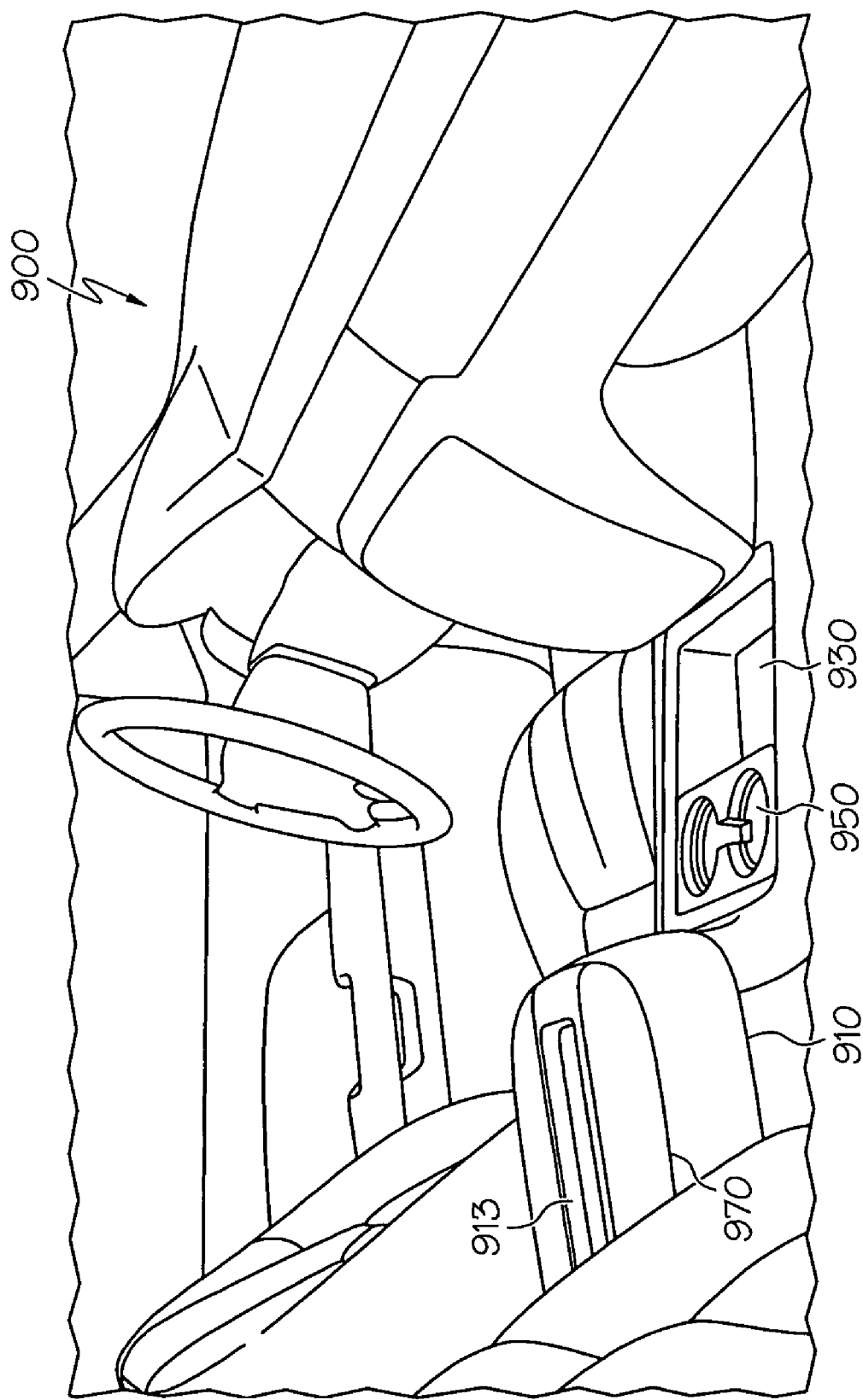
FIG. 9 illustrates an automobile interior having one or more inductive chargers integrally formed therein, in accordance with an example embodiment.

FIG. 9 illustrates an automobile interior 900 having one or more stand-alone and/or integrated inductive chargers therein, in accordance with an example embodiment. Automobile interior 900 includes various compartments and locations suitable for holding or storing items within the automobile, including various compartments and locations suitable for integrated and/or non-integrated (e.g., stand-alone) inductive chargers in accordance with various embodiments. For example, automobile interior 900 includes a center console storage bin 910, a secondary center console 930, a cup holder 950, a seat-back pocket (not illustrated in FIG. 9), an overhead console (not illustrated in FIG. 9), in an in-door storage compartment (not illustrated in FIG. 9), in a glove box (not illustrated in FIG. 9) and a dash-board ash tray (not illustrated in FIG. 9). In accordance with various embodiments, an inductive charger for wirelessly charging a portable electronic device having features discussed previously in conjunction with FIGS. 1-8 may be provided within automobile interior 900 at one or more of the above mentioned locations and/or at other locations within the automobile interior 900. For example, the dash-board ash tray present in many automobiles may be replaced with an integrated portable electronic device inductive charging bin. In accordance with an example embodiment, a portable electronic device may be held in position, for example with side restraints, which may be desirable in an automotive environment with its sideways forces resulting from braking, acceleration, and cornering.

Figure 10:
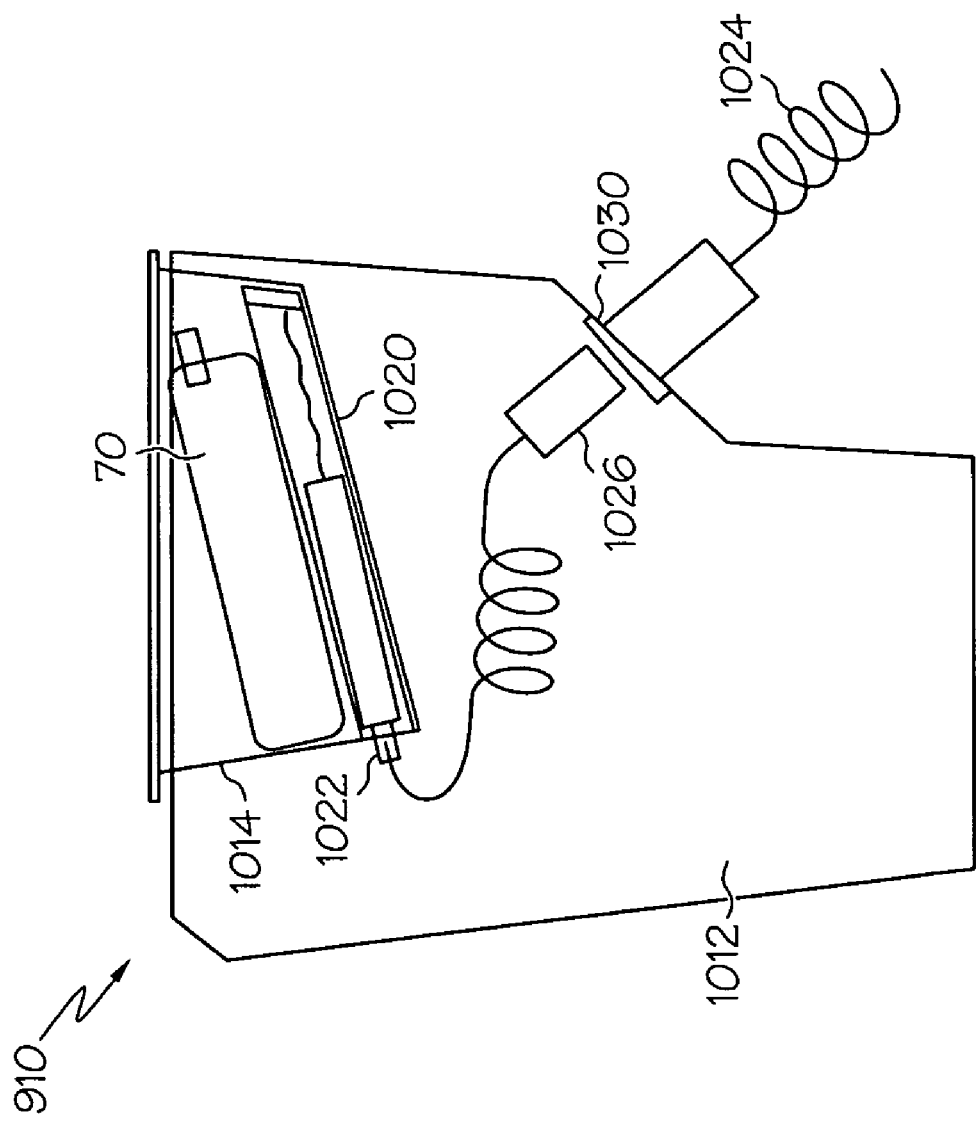
FIG. 10 illustrates a cross-sectional, side view of a "drop-in" type of stand-alone inductive charger, which may be housed within the interior compartment of an automobile center console storage bin, in accordance with an example embodiment.

In accordance with another embodiment, an inductive charger may be incorporated into the automobile interior 900 as a non-integrated device, such as a drop-in device. For example, FIG. 10 illustrates a cross-sectional, side view of a particular example embodiment of a "drop-in" type of stand-alone inductive charger 1020, which may be housed within the interior compartment of an automobile center console storage bin (e.g., center console storage bin 910, FIG. 9), in accordance with an example embodiment. The center console storage bin 910 includes an interior compartment 1012 and a lid (e.g. lid 970, FIG. 9, which is not shown in FIG. 10). The center console storage bin 910 further includes an inductive charger bin 1014 removably housed within the interior compartment 1012. The center console storage bin 910 further includes a power receptacle 1030, for example, an auxiliary power outlet or "APO", disposed within a wall of the storage bin 910. The power receptacle 1030 is electrically coupled to a power source for the automobile and is configured for providing power to auxiliary devices such as portable electronic devices and/or other devices, such as an inductive charger 1020.

The inductive charger bin 1014 includes an inductive charger 1020 having a power input 1022. The inductive charger 1020 may be electrically coupled to the automobile power source through a power cord 1024 and plug 1026. The cord plug 1026 may be electrically coupled between the inductive charger input 1022 and the bin power receptacle 1030 for providing power to the inductive charger 1020.

In accordance with an embodiment, the inductive charger 1020 includes a movable primary coil and associated primary coil magnet, each housed within a coil compartment internal to the inductive charger 1020. The inductive charger further includes a means for providing a current to the windings of the primary coil. For example, the inductive charger 1020 may include a flexible, flat ribbon cable or a coiled cable electrically coupled to the primary coil and the inductive charger input 1022, as discussed previously in reference to FIGS. 4-6. Alternatively, the inductive charger 1020 may include conductive surfaces and may couple the current to the primary coil through sliding contacts of the primary coil, as discussed in reference to FIG. 8. As also discussed previously, the inductive charger 1020 may be used to charge the batteries of a portable electronic device 70 that is placed on the inductive charger.

Figure 11:
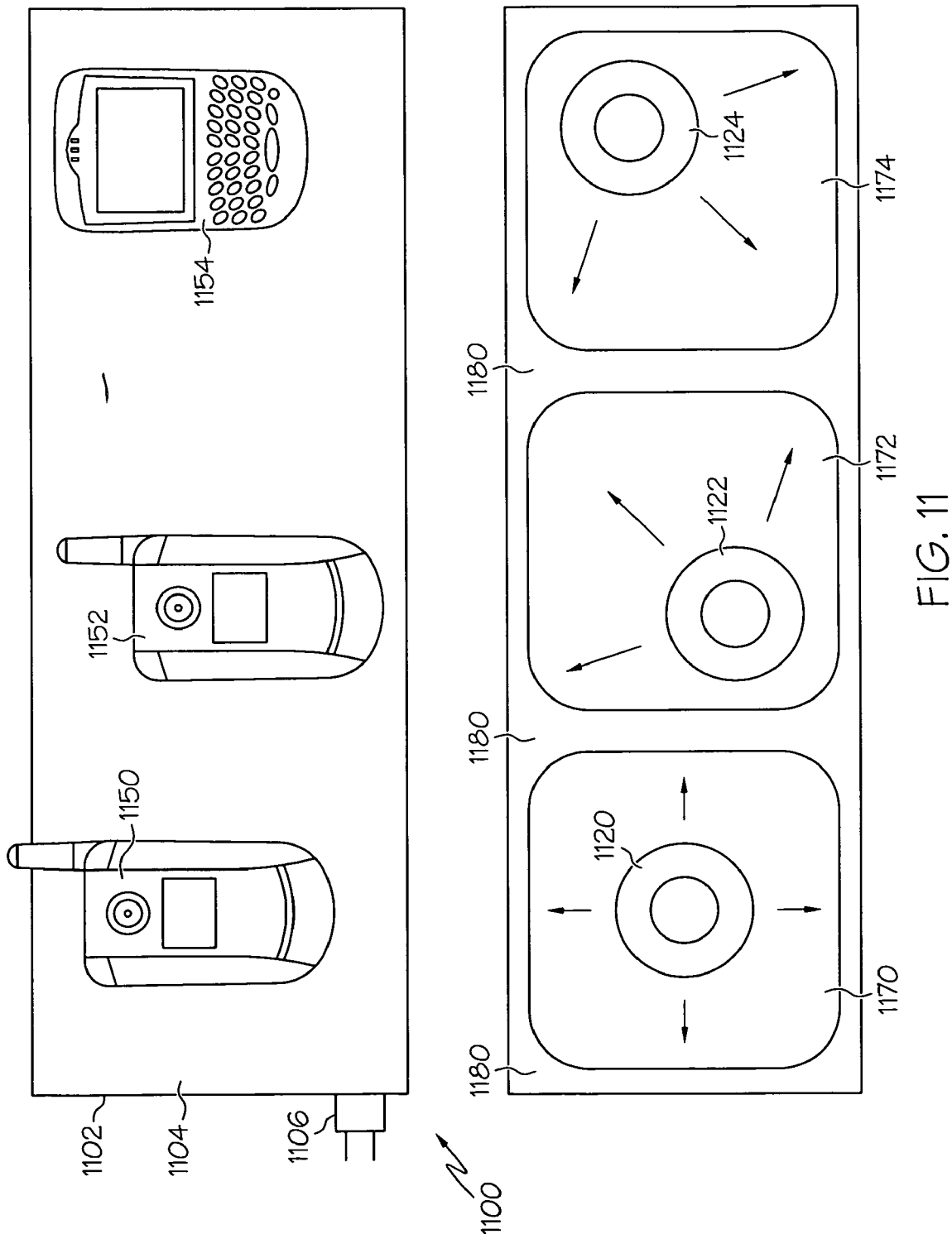
FIG. 11 illustrates top exterior and top cross-sectional views of an inductive charging system that includes multiple slidable primary coils, in accordance with an example embodiment.

FIG. 11 illustrates top exterior and top cross-sectional views of an inductive charging system 1100 that includes multiple slidable primary coils 1120, 1122, 1124 in accordance with an example embodiment. The inductive charging system 1100 includes a housing 1102 having a surface 1104, multiple interior compartments 1170, 1172, 1174, and a power input 1106. Sidewalls 1180 may separate each of the multiple interior compartments 1170, 1172, 1174 from each other, according to an embodiment. The primary coils 1120, 1122, 1124 are contained within the coil compartments 1170, 1172, 1174 of the housing 1102. More particularly, a first primary coil 1120 is contained within a first coil compartment 1170, a second primary coil 1122 is contained within a second coil compartment 1172, and a third primary coil 1122 is contained within a third coil compartment 1174. Although three coil compartments 1170, 1172, 1174 and primary coils 1120, 1122, 1124 are illustrated in FIG. 11, other embodiments may include two coil compartments and primary coils or more than three coil compartments and primary coils.

Each of the primary coils 1120, 1122, 1124 is electrically coupled to the power input 1106. The power input 1106 is mechanically coupled to the housing 1102 and is configured to connect to an external AC or DC power source and to provide power to an electronic module that provides an electrical current (of appropriate frequency and voltage) to the primary coils 1120, 1122, 1124. Current may be provided to each of the primary coils 1120, 1122, 1124 through a flexible, flat ribbon or coiled cable (not illustrated in FIG. 11) electrically coupled between each primary coil 1120, 1122, 1124, as described in reference to FIGS. 4-6, or through conductive surfaces (not illustrated in FIG. 11) in each of the respective coil compartments 1170, 1172, 1174 and sliding contacts (not illustrated in FIG. 11) attached to the primary coils 1120, 1122, 1124, as described in reference to FIG. 8. Each of the primary coils 1120, 1122, 1124 may be used to charge the batteries of a portable electronic device 1150, 1152, 1154 that is placed on the inductive charger 1100. Accordingly, the inductive charger 1100 of FIG. 11 may be used to simultaneously charge multiple portable electronic devices 1150, 1152, 1154.

While at least one example embodiment has been presented in the foregoing detailed description, it should be appreciated that a vast number of variations exist. It should also be appreciated that the example embodiment or example embodiments are only examples, and are not intended to limit the scope, applicability, or configuration of the inventive subject matter in any way. Rather, the foregoing detailed description will provide those skilled in the art with a convenient road map for implementing the example embodiment or example embodiments. It should be understood that various changes can be made in the function and arrangement of elements without departing from the scope of the inventive subject matter as set forth in the appended claims and the legal equivalents thereof.

What is claimed is:

1. A vehicular inductive charger for use in a vehicle having an interior, comprising:
    a first compartment within the interior;
    a housing within the first compartment and having an internal compartment, wherein the internal compartment has a first lateral dimension;
    a primary coil disposed within the internal compartment, wherein the primary coil has a second lateral dimension that is less than the first lateral dimension, and the primary coil is slidably engaged within the internal compartment;
    a power input coupled to the housing and adapted to receive an electrical current from an external power source; and
    a means for providing the electrical current to the primary coil, wherein the means for providing the electrical current is coupled between the power input and the primary coil, wherein the means for providing comprises:
    a first conductive surface electrically coupled to the power input and disposed within the internal compartment;
    a second conductive surface electrically coupled to the power input and disposed within the internal compartment;
    a first contact electrically coupled to the primary coil and adapted to slidably engage with the first conductive surface; and
    a second contact electrically coupled to the primary coil and adapted to slidably engage with the second conductive surface.

2. The inductive charger of claim 1, further comprising:
    a magnet attached to the primary coil, wherein the magnet is adapted to exert a force to the primary coil sufficient to cause the primary coil to slide within the internal compartment when the magnet is acted upon by an external magnetic field.

3. The inductive charger of claim 2, wherein the magnet is attached to the primary coil within a central opening of the primary coil.

4. The inductive charger of claim 1, further comprising:
    a coil bobbin disposed within the internal compartment, wherein the primary coil is disposed on the coil bobbin.

5. The inductive charger of claim 1, wherein the housing includes at least one additional internal compartment, and the inductive charger further comprises:
    at least one additional primary coil disposed within the at least one additional internal compartment.

6. The inductive charger of claim 1, wherein the housing further comprises:
    a top member, a bottom member, and a sidewall, which define the internal compartment; and
    a ledge disposed between the sidewall and the bottom member within the internal compartment,
    wherein the ledge is comprised of a noise-dampening material.

7. The inductive charger of claim 1, wherein the housing further comprises:
    a top member, a bottom member, and a sidewall, which define the internal compartment,
    wherein the sidewall includes a noise-dampening material disposed within the internal compartment.

8. The inductive charger of claim 1, further comprising:
    a flexible cable electrically coupled to the primary coil, and wherein the internal compartment includes:
    a substantially circular coil compartment for receiving the primary coil; and
    a substantially elliptical cable compartment extending from the substantially circular coil compartment for receiving the flexible cable.

9. The inductive charger of claim 8, wherein the flexible cable comprises a flexible, flat ribbon cable.

* * * * *